Dec. 24, 1957 C. J. LINZELL 2,817,535
COLLETS
Filed Nov. 30, 1953
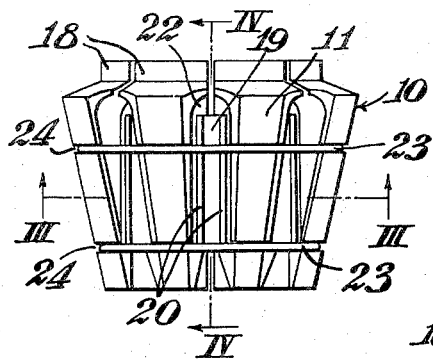
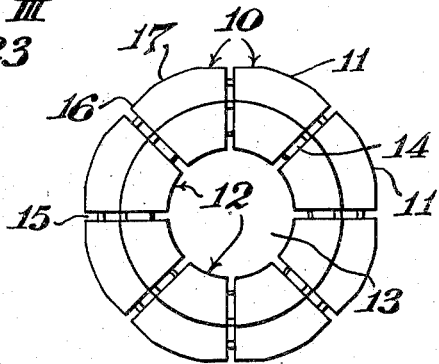
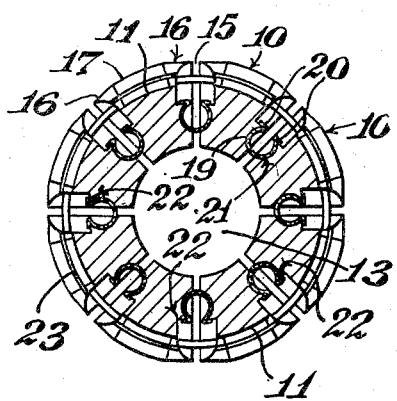
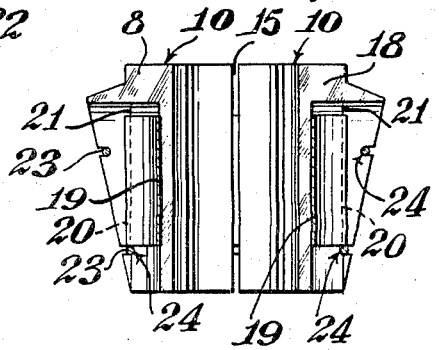
INVENTOR
CECIL J. LINZELL

United States Patent Office 2,817,535
Patented Dec. 24, 1957

2,817,535
COLLETS

Cecil John Linzell, Witney, England, assignor to Crawford & Company (Tottenham) Limited, Witney, England, a British company Application November 30, 1953, Serial No. 394,935

Claims priority, application Great Britain April 24, 1953

6 Claims. (Cl. 279—55)

This invention relates to collets which are externally tapered so that when pressed into and held in a correspondingly internally-tapered chuck or like holder the collet will be contracted to cause a cylindrical axial passage or bore in the collet to obtain gripping engagement on a tool shank or workpiece inserted into said passage or bore. The invention has for its object to provide an improved collet of this nature which will adapt itself to suit inserted pieces in a range of diameters, for instance within the range of ⅛ inch, and by means of which, in respect of all pieces within such range, a uniform parallel grip will be obtained on the inserted piece along the length of its inserted portion, the said inserted piece being maintained concentric within the chuck. A further object is to provide a collet having these characteristics which is simple in construction, capable of easy, expeditious and economical production and likely to give efficient service over a long period.

According to the invention, a collet for use in an internally-tapered chuck or like holder comprises a plurality of rigid gripping segments distributed circumferentially around said collet, separate spring elements inserted and interposed between adjacent segments throughout the set of said segments, and retaining means for maintaining said segments and spring elements assembled together, the gripping segments being shaped so that conjointly they form a body which is tapered externally and has a cylindrical axial passage, the spring elements giving the collet uniform radial flexibility throughout its circumference and allowing the collet to be contracted by inward displacement of the gripping segments while said segments remain mutually parallel.

In a preferred form of the invention, the spring elements are in the form of elongated spring blades which are of arcuate cross-section and are located in recesses formed in the opposed side faces of the gripping segments, so as to flex transversely by the mutual approach of the said segments. Conveniently, said spring blades are substantially C-shaped in cross-section.

Preferably, the recesses in the side faces of the segments are channels or grooves of arcuate cross-section in correspondence with the curvature of the side portions of the spring blades that seat in said channels or grooves. This will afford easy riding of the outer faces of the blades in said channels or grooves as the spring blades flex.

The means for maintaining the component parts assembled, viz., the segments and the spring blades or other spring elements, may be contractible springy rings or bands having overlapping ends, these rings or bands serving as clips, and being fitted and located in aligned peripheral transverse grooves in the segments so that each ring or band encircles the set of segments without projecting above the outer faces of said segments. Conveniently, the segments are formed with one set of grooves adjacent the larger diameter end of the collet and another set of grooves adjacent the smaller diameter end thereof.

One embodiment of the invention will now be described by way of example with reference to the accompanying drawings, wherein:

Figure 1 is a side elevation of the collet,

Figure 2 is an end view looking on the wide end of the collet.

Figure 3 is a cross-section on the line III—III of Figure 1, and

Figure 4 is a cross-section on the line IV—IV of Figure 1.

The collet comprises a plurality of wedge-shaped segments 10 each having an outer face 11 which is convergent with respect to an inner face 12, whereby when the segments are assembled as shown, the assembly is of tapered form having a cylindrical axial passage 13, and convergent side faces 14 such that parallel-sided passages 15 are formed between the segments. The outer faces 11 are curved in cross-section and are chamfered off at the sides, as indicated at 16, the remaining central portion 17 forming the actual seating part. At the larger diameter end of the collet, the segments have shaped extensions 18 which together form a short cylindrical boss.

The segments 10 are resiliently spaced apart by means of elongated springs 19, which, as shown, are substantially C-shaped in cross-section, and have short outturned lips or flanges 20 along their free edges. The springs 19 are adapted to be slid into correspondingly shaped channels formed by recesses 21 in the opposed side faces 14 of the segments 10. The recesses 21 begin at the smaller diameter end of the collet and terminate a short distance from the larger diameter end of the collet, the springs 19 being slid in from the smaller diameter end until they contact the shoulder formed at the larger diameter end. As shown, the springs 19 terminate a short distance from the smaller diameter end of the collet. The recesses 21 are parallel to the inner faces 12 of the segments and are of constant cross-section. As the cross-section of the segments increases however, the side faces 14 are cut away above the recesses to form shoulders 22 adapted to be engaged by said lips or flanges 20.

The segments 10 and springs 19 are maintained assembled by means of contractible springy rings or bands 23 having overlapping ends, said rings or bands being located in aligned peripheral transverse grooves 24 in the segments so that each ring or band encircles the set of segments without projecting above the outer faces 11 of said segments. Conveniently, the position of the grooves at the smaller diameter end is such that they intersect the recesses 21 so that the ring or band 23 also acts as a stop to retain the springs 19 in position after they have been inserted as described.

It will be understood that a collet made as above described will flex effectively to adapt itself to an inserted tool shank or workpiece and afford a uniform grip thereon along the full length of the collet and at all the distributed circumferential positions despite the shank or workpiece being under or over sized. The amount of yield may be such that the collet can be used satisfactorily with shanks or workpieces in a small range of different diameters.

I claim:

1. A collet for use in an internally-tapered chuck, comprising a plurality of circumferentially disposed rigid gripping segments, each of said segments being wedge-shaped in transverse cross-section and having an outer face which is convergent with respect to an inner face, whereby said segments conjointly form a body which is tapered externally and has a parallel-sided cylindrical axial passage, whose cross-section can be varied by inward movement of said gripping segments, elongated recesses formed in the adjacent side faces of said segments, said segments having a shoulder formed in each of their side faces adjacent the recess, elongated spring blades of arcuate cross-section having short out-turned lips or flanges along their free edges, said spring blades being located in said recesses and being adapted to bear against said segments along the whole length of the blade with each spring blade contacting the segments over a major part of the arcuate portion of the spring blade and with each lip or flange engaging one of said shoulders, and retaining means for maintaining said segments and said spring elements assembled together.

2. A collet for use in an internally-tapered chuck, comprising a plurality of circumferentially disposed rigid gripping segments, each of said segments being wedge-shaped in transverse cross-section and having an outer face which is convergent with respect to an inner face, whereby said segments conjointly form a body which is tapered externally and has a cylindrical axial passage, each segment having a channel of arcuate cross-section formed in each of its side faces, a plurality of elongated spring blades of substantially C-shaped cross-section, one spring blade being located in each pair of adjacent channels with a major part of the arcuate portion of the spring blade contacting said adjacent channels, and retaining means for maintaining said segments and said spring elements assembled together.

3. A collet for use in an internally-tapered chuck, comprising a plurality of circumferentially disposed rigid gripping segments, each of said segments being wedge-shaped in transverse cross-section and having an outer face which is convergent with respect to an inner face, whereby said segments conjointly form a body which is tapered externally and has a cylindrical axial passage, recesses formed in the adjacent side faces of said segments, elongated spring blades of arcuate cross-section located in said recesses, said recesses beginning at the smaller diameter end of the collet and terminating a short distance from the larger diameter end thereof and said spring blades terminating short of said smaller diameter end, and retaining means consisting of contractible springy rings having overlapping ends, said rings being fitted into aligned peripheral transverse grooves in the outer faces of said segments so that each ring encircles the set of segments without projecting above the outer faces of said segments, the segments being formed with one set of aligned grooves adjacent the larger diameter end of the collet and another set of aligned grooves adjacent the smaller diameter end thereof, the grooves at the smaller diameter end intersecting said recesses so that the ring at said smaller diameter end acts as a stop to retain said springs in said recesses.

4. A collet according to claim 2, in which said segments have a shoulder in each side face adjoining the channel of arcuate cross-section and said spring blades have short out-turned lips or flanges along their free edges which each engage a shoulder of an adjacent segment.

5. A collet for use in an internally-tapered chuck, comprising a plurality of circumferentially disposed rigid gripping segments, each of said segments being wedge-shaped in transverse cross-section and having an outer face which is convergent with respect to an inner face, whereby said segments conjointly form a body which is tapered externally and has a parallel-sided cylindrical axial passage whose cross-section can be varied by inward movement of said gripping segments, each segment having an elongated recess in each side face and having a shoulder adjoining that edge of each recess which lies nearest to the outer surface of the segment, elongated spring blades of arcuate cross-section each interposed between one pair of adjacent segments and seated in the elongated recesses of those segments, each spring blade contacting the segments over a major part of the arcuate portion of the spring blade, and retaining means for maintaining said segments and said spring blades assembled together.

6. A collet for use in an internally-tapered chuck, comprising a plurality of circumferentially disposed rigid gripping segments, each of said segments being wedge-shaped in transverse cross-section and having an outer face which is convergent with respect to an inner face, whereby said segments conjointly form a body which is tapered externally and has a parallel-sided cylindrical axial passage whose cross-section can be varied by inward movement of said gripping segments, said segments having elongated recesses in each side face, elongated spring blades of arcuate cross-section each interposed between one pair of adjacent segments and seated in the elongated recesses of the segments, each spring blade contacting the segments over a major part of the arcuate portion of the spring blade, and retaining means for maintaining said segments and said spring blades assembled together.

References Cited in the file of this patent

UNITED STATES PATENTS

| | | |
|---|---|---|
| 839,577 | Gerds | Dec. 25, 1906 |
| 870,106 | Jones | Nov. 5, 1907 |
| 1,132,550 | Bodmer | Mar. 23, 1915 |
| 1,679,515 | Cone | Aug. 7, 1928 |
| 2,065,817 | Marien | Dec. 29, 1936 |
| 2,078,033 | Six | Apr. 20, 1937 |
| 2,402,571 | Olander | June 25, 1946 |
| 2,441,599 | Schneider | May 18, 1948 |
| 2,478,102 | Hull et al. | Aug. 2, 1949 |
| 2,591,287 | Pellar | Apr. 1, 1952 |
| 2,631,860 | Bronson | Mar. 17, 1953 |

FOREIGN PATENTS

| | | |
|---|---|---|
| 398,951 | Germany | July 29, 1924 |

OTHER REFERENCES

"American Machinist," July 6, 1922, page 29.